UNITED STATES PATENT OFFICE.

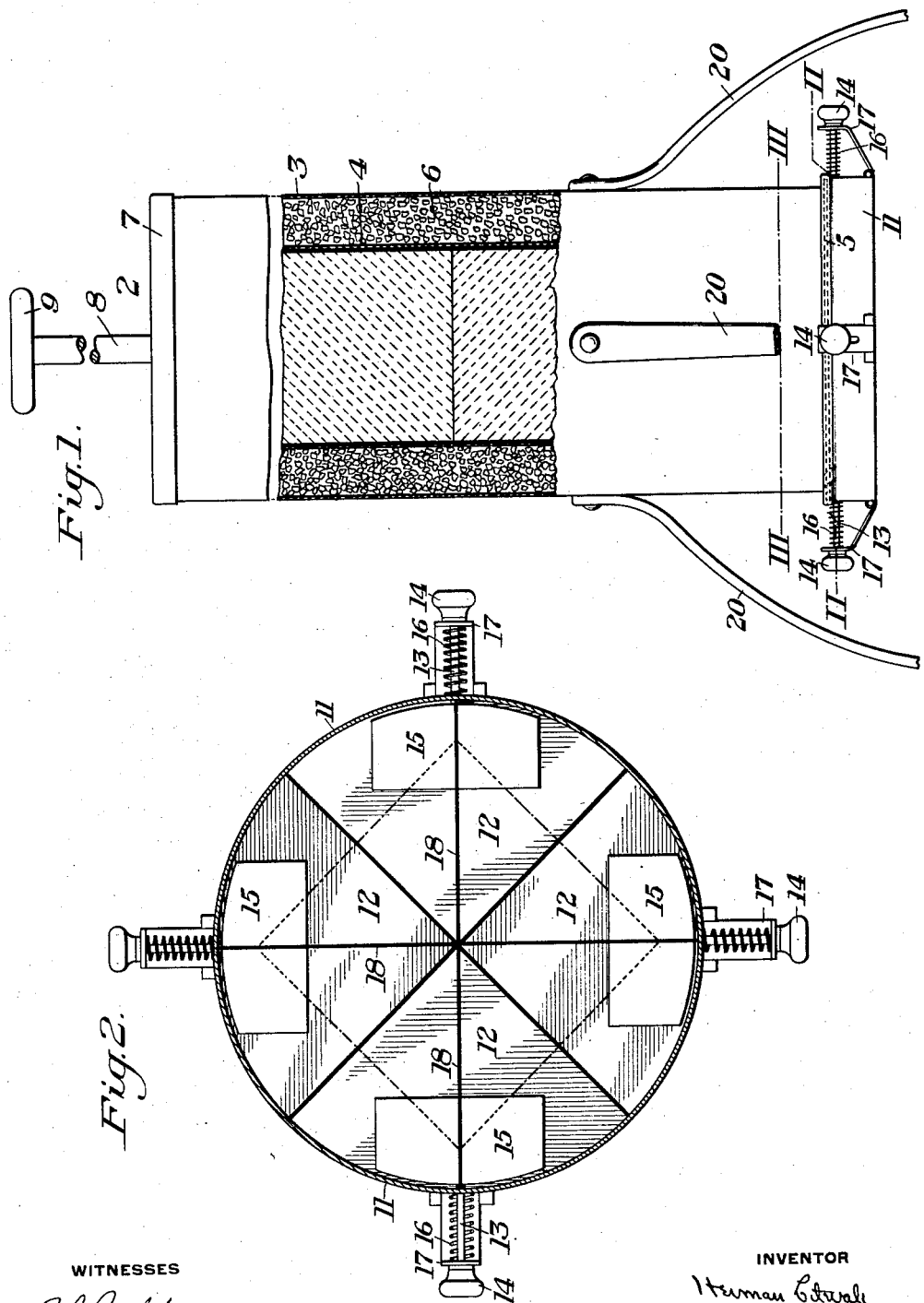

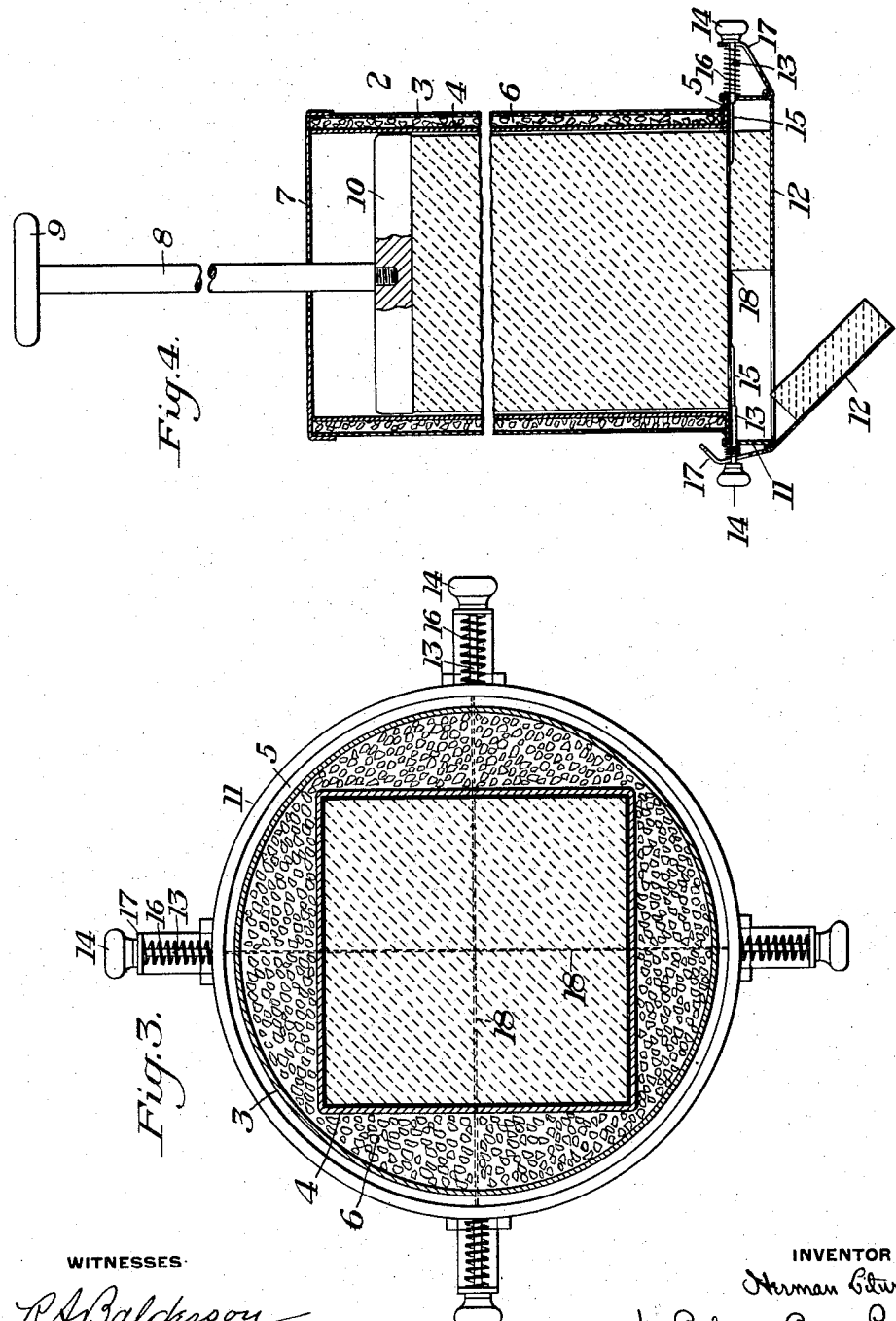

HERMAN LITWAK, OF PITTSBURGH, PENNSYLVANIA.

BUTTER CUTTING AND DISPENSING DEVICE.

1,187,073.  Specification of Letters Patent.  Patented June 13, 1916.

Application filed December 11, 1915. Serial No. 66,294.

*To all whom it may concern:*

Be it known that I, HERMAN LITWAK, a citizen of the United States, and a resident of Pittsburgh, in the county of Allegheny of Pittsburgh, in the county of Allegheny and State of Pennsylvania, have invented a new and useful Improvement in Butter Cutting and Dispensing Devices, of which the following is a full, clear, and exact description, reference being had to the accompanying drawings, forming part of this specification, in which—

Figure 1 is a side elevation partially in section of one form of my improved device, and which is adapted to receive two one pound cakes of butter. Fig. 2 is a sectional view on the line II—II of Fig. 1, on a larger scale, showing the cutting device shifted at an angle of 45° with relation to a container. Fig. 3 is a similar view on the line III—III of Fig. 1, and Fig. 4 is a longitudinal sectional view of a device for a single cake of butter.

This invention relates to an improvement in containers and dispensing devices for butter and is designed to provide a cheap and efficient device in which a large cake of butter can be retained and which can be cut up in small blocks; and in which the small blocks, as well as the main cake, will remain in a cold state.

The object of my invention is to provide a device of this character which is normally placed on the table in a restaurant and from which the waiter can remove blocks of butter as required by the guests. Heretofore, the usual practice has been to cut up the butter in small blocks and place it in a suitable containing vessel with cracked ice, in order to maintain it in a hard condition. I have found that this practice is very inconvenient and also very wasteful, as a large number of the blocks are broken and distorted and are, therefore, not in condition to serve to guests. These broken pieces are often used for cooking purposes, and frequently they are melted and re-shaped into blocks, which destroys the original consistency and flavor of the butter.

The precise nature of my invention will be best understood by reference to the accompanying drawings which will now be described, it being premised, however, that various changes may be made in the details of construction and general arrangement of the parts, without departing from the spirit and scope of my invention, as defined in the appended claims.

Referring to the accompanying drawings, the reference character 2 designates the entire container, which comprises a cylindrical shell 3 and a square shell 4 within the cylindrical shell. These two shells are secured to a bottom plate 5, and 6 is a chamber between the two shells, which is packed with ice to cool the inner shell 4.

7 is a cap for inclosing the upper ends of both shells and is provided with an annular opening for a rod 8, having a suitable grip 9 on the upper end and a piston 10 within the shell 4. Rotatably mounted on the outer edge of the bottom plate 5 is an annular shell 11, and hinged to the lower edge of this shell are four doors 12 which form the bottom closure for the shell 11. Slidably mounted in the upper portion of the shell 11 and above the center of each of the doors 12 is a stem 13 having a handle 14 and a stripper 15.

16 are springs surrounding the stems 13 which engage the shell 11 and one end of the slotted levers 17 which form extensions of the doors 12; the arrangement being such that when either of the handles 14 are moved inwardly for the purpose hereinafter described, its door will be moved downwardly as shown at the left hand side of Fig. 4.

Connected to the upper end of the shell 11 are two radial wires 18 which are at right angles to each other and cross each other at the center of the container. These wires are arranged to slice the cake of butter 19 which is within the inner shell, when the same is moved longitudinally, and to cut off the sliced portion into blocks when the shell 11 is rotated.

In Fig. 1 of the drawings, I have shown supporting legs 20 for the container, which are arranged to support the container in such a manner that the bottom thereof will be the proper distance above the table.

The operation of the device is as follows: The block of butter is placed in the initial shell 4, and the lower shell 11 is rotated to bring the cutting wires 18 to the position shown in Fig. 3. The piston 10 is then moved downwardly to force the block of butter over the wires and to bring the lower end thereof in contact with the doors 12. The lower shell 11 is then rotated at least 90° in one direction to cut off the four blocks of butter by means of the wires 18, and the shell is then moved to the positions shown in Figs. 2 and 4, so that the wires 18 lie at an angle of 45° to the position shown in Fig. 3, to bring the junction of the doors 12 below the longitudinal cuts in the butter. Either of the handles 14 is then pushed inwardly which will open the door connected thereto and at the same time push the stripper between the severed block and the cake of butter, permitting the block of butter to drop into a suitable receptacle which is placed below the container, but if the block adheres to the door 12, it can readily be removed with a fork or suitable implement.

The advantages of my invention result from the provision of a container for the reception of a large cake of butter and means for slicing the cake into a plurality of blocks and to then cut said blocks from the main cake, together with means for removing the individual blocks from the container without disturbing the remainder of the blocks.

I claim:

1. A butter dispensing device, comprising a main container and an auxiliary container, means for slicing the butter in a longitudinal direction as it passes from the main container to the auxiliary container, said slicing means also being adapted to be rotated to sever the sliced portion of the butter in the auxiliary container from the butter in the main container, and a movable closure for the end of the auxiliary container, said closure being arranged to retain the cut blocks with the auxiliary container; substantially as described.

2. A butter dispensing device, comprising a container for the reception of a cake of butter, an auxiliary container rotatably mounted on the lower end of the main container, a wire extending across the bottom of the main container and connected to the auxiliary container, means for forcing a portion of the cake of butter from the main container into the auxiliary container over said wire to slice it longitudinally, said wire being arranged to be rotated with the auxiliary container to slice the cake of butter transversely, and means for separating the individual blocks in the auxiliary container from the cake in the main container; substantially as described.

3. A butter dispensing device, comprising a container, a shell rotatably mounted on the lower end of said container, a plurality of wires connected to said shell and extending at approximately 90° to each other across the lower end of the container, and four doors pivotally connected to the lower end of the shell; substantially as described.

4. A butter dispensing device comprising inner and outer shells, there being an ice chamber between said shells, a rotary shell mounted on the lower ends of the first mentioned shells, a plurality of wires connected to the rotary shell immediately below the lower ends of the main shells, said wires extending at right angles to each other, and four segmental doors pivotally connected to the lower end of the rotary shell; substantially as described.

5. A butter dispensing device comprising inner and outer shells, there being an ice chamber between said shells, a rotary shell mounted on the lower ends of the first mentioned shells, a plurality of wires connected to the rotary shell immediately below the lower ends of the main shells, said wires extending at right angles to each other, and four segmental doors pivotally connected to the lower end of the rotary shell, a movable stem mounted on the rotary shell for each of said doors, an extension on each door connected to said stem and arranged to move the door to its open position when the stem is moved inwardly; substantially as described.

6. A butter dispensing device, comprising a container, a shell rotatably mounted on the lower end of said container, a plurality of wires connected to said shell and extending at approximately 90° to each other across the lower end of the container, and four spring actuated doors pivotally connected to the lower end of the shell; substantially as described.

7. A butter dispensing device, comprising a two part container, one part of which is arranged to be rotated relative to the other, a cutting device in one of said parts extending in a radial direction across the longitudinal center of the container parts, and doors hinged to said last mentioned container part beyond the cutting device and forming a closure for one end of the dispensing device; substantially as described.

In testimony whereof I have hereunto set my hand.

HERMAN LITWAK.

Witnesses:
 JESSE B. HELLER,
 H. M. CORWIN.